United States Patent [19]
Mims

[11] Patent Number: 5,634,549
[45] Date of Patent: Jun. 3, 1997

[54] FOOD ITEM CONVEYOR LANE MULTIPLIER

[75] Inventor: Herman D. Mims, Ellenboro, N.C.

[73] Assignee: Machine Builders and Design, Shelby, N.C.

[21] Appl. No.: 421,906

[22] Filed: Apr. 14, 1995

[51] Int. Cl.⁶ .......................... B65G 29/00; B65G 47/84
[52] U.S. Cl. .................................................. 198/441
[58] Field of Search ............................ 198/441, 436, 198/440

[56] References Cited

U.S. PATENT DOCUMENTS

| | | | |
|---|---|---|---|
| 2,699,278 | 1/1955 | Wysocki | 198/459 |
| 2,756,553 | 7/1956 | Ferguson et al. | 198/441 |
| 2,991,869 | 3/1961 | Packman et al. | 198/623 |
| 3,599,781 | 8/1971 | Hoadley | 198/723 |
| 4,498,576 | 2/1985 | Anderson | 198/441 |
| 4,535,881 | 8/1985 | Mims | 198/420 |
| 5,070,994 | 12/1991 | Focke | 198/441 |
| 5,113,996 | 5/1992 | Francioni | 198/441 |
| 5,231,926 | 8/1993 | Williams et al. | 198/441 |

*Primary Examiner*—Karen B. Merritt
*Assistant Examiner*—Douglas Hess
*Attorney, Agent, or Firm*—Sughrue, Mion, Zinn, Macpeak & Seas

[57] ABSTRACT

A rotary displacer is provided on a conveyor which carries food items in predefined lanes. The rotary displacer has a rotating member with spokes extending therefrom. The spokes serve to deflect the food items to one side or the other along a direction transverse to a direction of conveyance to offset the center of the items from the center of the lane. Subsequently, the offset items are directed into a sliding alignment device, or the like, to separate each lane of items into two separate lanes. The spokes can be positioned along the transverse direction to allow various deflection configurations. For example alternating spokes can be offset in opposite directions to deflect every other item in an alternate direction.

6 Claims, 8 Drawing Sheets

FOOD ITEM CONVEYOR LANE MULTIPLIER

BACKGROUND OF THE INVENTION

1. Field of the Invention

The invention pertains to an apparatus for conveying and sorting items. In particular, the invention relates to an apparatus for multiplying the number of lanes of conveyed food items, such as cookies, to allow continuous processing of the food items.

2. Description of the Related Art

In the preparation of food items such as cookies, after the cookies have been baked, they are transferred from an oven to a conveyor belt to be conveyed to a packaging station or other processing apparatus. When the cookies are conveyed from the oven, they are arranged in layers of various numbers. In order to facilitate subsequent operations, such as a packaging operation, it is desired to rearrange the cookies into varying numbers of specified lanes.

However, it is often required to change the number of lanes of food items being conveyed to conform to various downstream processing devices. For example, a downstream processing device may have a serial throughput which is much less than that of the oven or other upstream device and thus the food items must be spread out, i.e., the number of lanes must be increased, in order to allow parallel processing, to avoid accumulation of the items, and allow continuous processing. Various devices have been utilized to multiply lanes. For example, it is known to utilize a mechanical flapper device which selectively diverts items into separate lanes as they are conveyed. Also, it is known to utilize a pneumatic jet to divert items. In either case, the food items must be sensed and precise timing is required for either the mechanical or pneumatic operator. This renders known systems quite complicated.

Further, U.S. Pat. No. 4,535,881 discloses the use of rotary members constructed of a central hub having a plurality of retractable spokes extending therefrom. Two spokes are in contact with the surface of the conveyor belt at any one time. The distance between the ends of the spokes in contact with the conveyor belt is set to be approximately the same as the diameter of the food items being conveyed. The food items engage the spokes of the rotary members in much the same manner as the teeth of a sprocket gear engage a chain to thus maintain a uniform spacing between food items in each line. This process is known as indexing.

It is an object of the present invention to provide an apparatus for conveying and sorting food items, specifically cookies and like shaped items, in which the food items are directed into lanes having uniform distances between the items and subsequently, the number of lanes of the items is changed.

It is a further object of the invention to provide such an apparatus in which the lane multiplying process is carried out without damage to the food items.

SUMMARY OF THE INVENTION

In accordance with these and other objects of the invention, there is provided a food items conveying and sorting apparatus in which the food items to be sorted are first conveyed in lanes to an indexing device, such as a rotary indexer upon a conveying surface of a conveyor. The rotary indexer can be composed of a rotary member, or a plurality of rotary members disposed upon a single shaft and rotated together above the conveying surface. The rotary member is provided with a plurality of outwardly extending spring-loaded spokes. The distance between the outward ends of two adjacent spokes corresponds approximately to the diameter of the food items to be conveyed and separated so that two spokes can substantially straddle one food item. Ends of the spokes are in engagement with the conveying surface for a predetermined distance of movement of the food items past the first rotary sorter to place the food items in a known relative orientation.

A rotary displacer is provided downstream from the indexing device and is driven in concert therewith. The basic construction of the rotary displacer is similar to that of the rotary indexer. However, spokes of the rotary displacer are disposed in respective lanes between adjacent spokes of the rotary indexer along a direction transverse to the conveyance direction. As the food items are released from the rotary indexer in a defined positional relationship they are immediately conveyed to the rotary displacer. The spokes of the rotary displacer serve to deflect the food items to one side or the other along a direction transverse to a direction of conveyance to offset the center of the items from the center of the lane. Subsequently, the offset items are directed into a sliding alignment device, or the like, to separate each lane of items exiting the rotary displacer into two separate lanes. The spokes of the rotary displacer can be positioned along the transverse direction to allow various deflection configurations. For example alternating spokes can be offset in opposite directions to deflect every other item in an alternate direction, i.e., right, left, right, etc.

DETAILED DESCRIPTION OF THE PREFERRED EMBODIMENT

Figure 1:
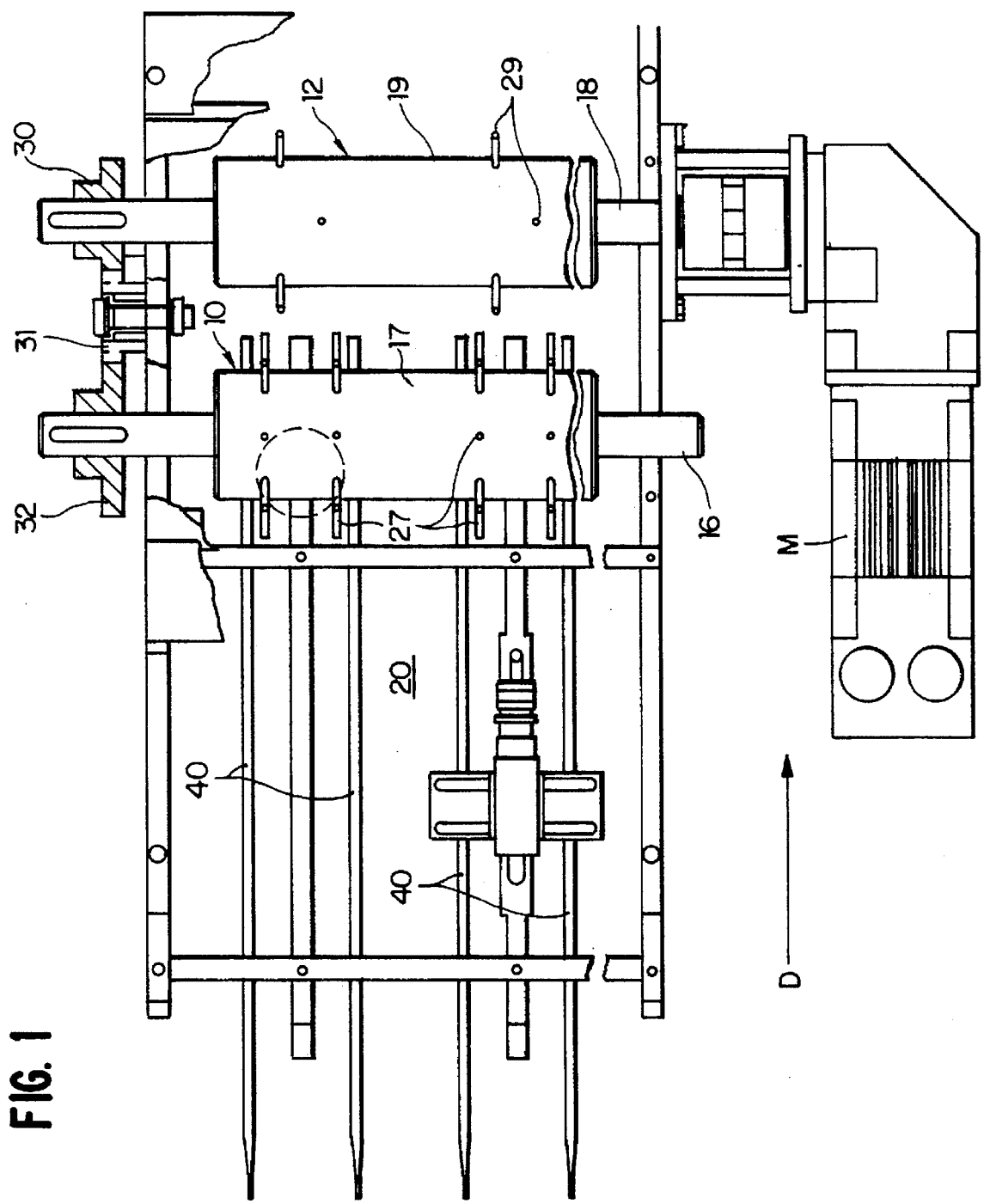
FIG. 1 is a top view of the preferred embodiment of the invention.
Figure 2:
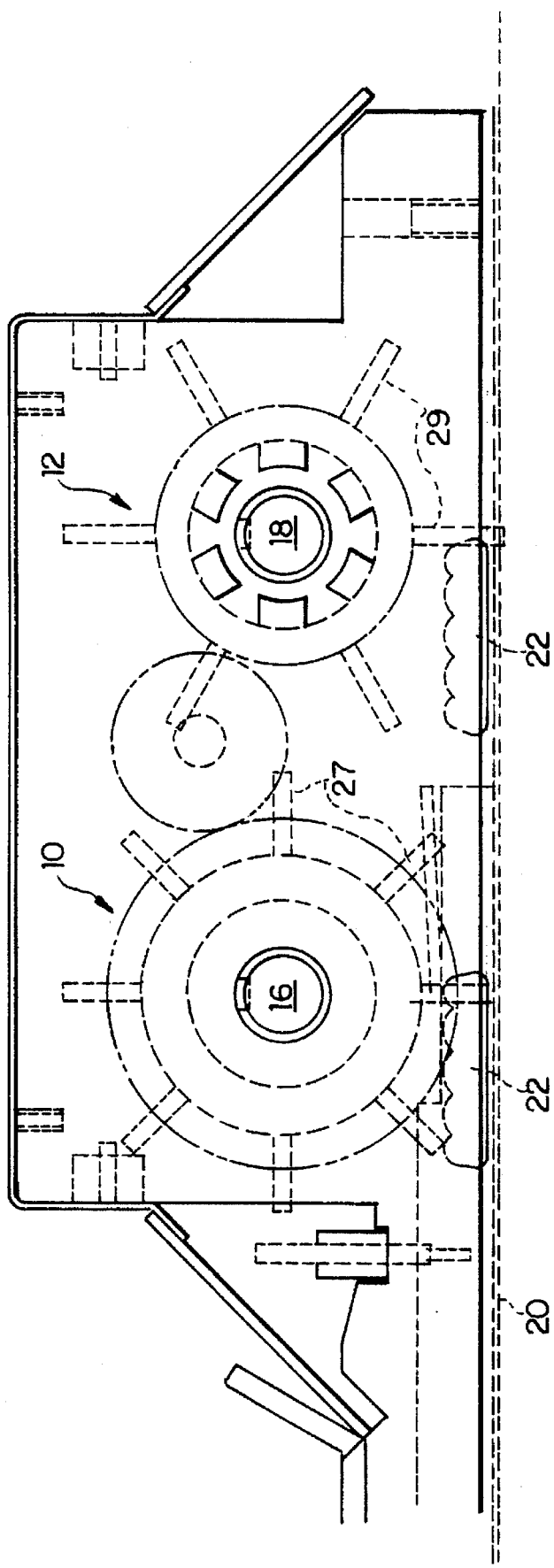
FIG. 2 is a side view of the apparatus shown in FIG. 1 with the motor removed for clarity.

FIGS. 1 and 2 illustrate the preferred embodiment of the lane multiplier. The lane multiplier can utilize various known indexing devices, i.e., devices for placing the items in a desired relative position. However, the preferred embodiment utilizes rotary indexer 10 which is similar to that disclosed in U.S. Pat. No. 4,535,881 which is discussed above. Referring first to FIGS. 1 and 2, rotary indexer 10 is placed upstream of rotary displacer 12 with respect to a conveying direction of conveyor 20 which is indicated by the arrow D in the FIGURES. Of course, conveyor 20 can be a known belt conveyor or any type of conveyor having a substantially planar supporting surface.

Figure 3:
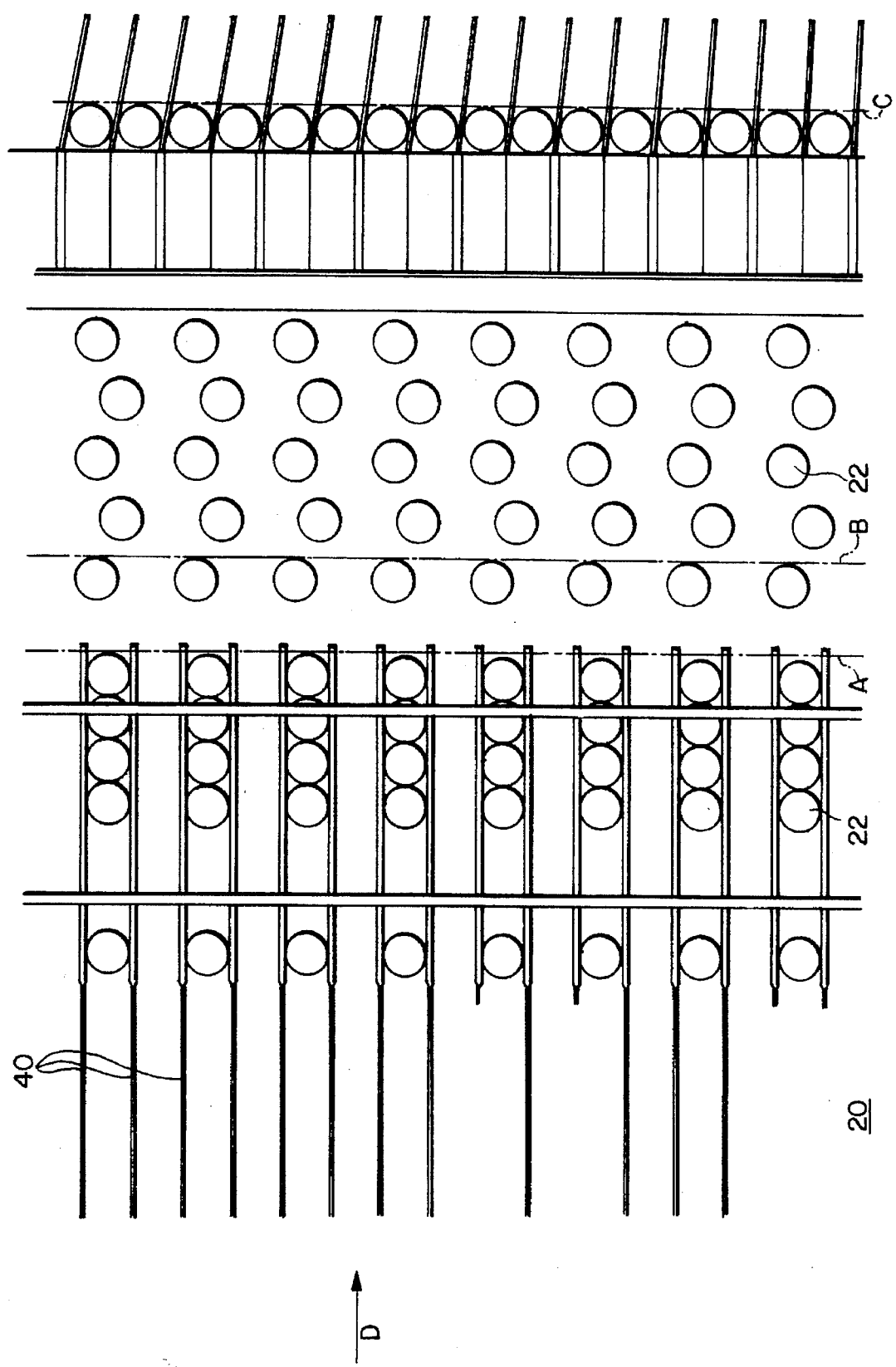
FIG. 3 is a top view of the preferred embodiment with the indexer and displacer omitted to illustrate the position of the food items.

FIG. 3 is a top view of the lane multiplier wherein rotary indexer 10 and rotary displacer 12 are not illustrated for clarity. Food items, such as cookies 22 (only some of which are marked by the reference numeral) are transferred onto the conveyor belt 20 in a generally random nature after exiting a processing device such as an oven. A plurality of parallel guides 40 are disposed slightly above the upper surface of conveyor 20 to place cookies 22 in lanes in a known manner. Shaft 16 of rotary indexer 10 is mounted above the surface of conveyor 20 near the ends of the guides 40. Shaft 16 has a longitudinal axis which is perpendicular to the direction of movement of conveyor 20. Upon shaft 16 is mounted rotary member 17 which is rotated with shaft 16. A plurality of pairs of spokes 27, for instance eight pairs of spokes 27 spaced from one another by a uniform angle of 45 degrees, are disposed on rotary member 17 in association with each lane defined by guides 40. Each spoke 27 is spring loaded and can retreat into rotary member 17 against the biasing force of a spring (not illustrated). When in contact with the surface of the conveyor belt, the distance between two adjacent tips of spokes 27 should be approximately the diameter of cookies 22 to be conveyed and sorted. Also, the distance along conveyor 20 through which a spoke tip remains in contact with conveyor 20 should be sufficiently great so that a second cookie 22 is engaged by rotary spokes 27 before a first cookie 2 is released by spokes 27 as shaft 16 is rotated. Shaft 16, rotary member 17, and spokes 27 constitute rotary indexer 10 which operates in the manner disclosed in U.S. Pat. No. 4,535,881. As disclosed in that patent, spokes 27 straddle cookies 22 so that rotary indexer 10 serves to place cookies 22 which have been formed in lanes by guides 40 into position with a predetermined distance between successive cookies 22 as indicated at line A in FIG. 3.

After emerging from rotary indexer 10, cookies 22 continue towards rotary displacer 12. Rotary displacer 12 includes shaft 18, rotary member 19 and spokes 29. Spokes 29 are disposed at regular intervals around the circumference of rotary member 19, for example 5 spokes 29 each 72 degrees apart from one another in each lane, as illustrated in FIG. 2. Spokes 29 are disposed within the lanes defined by guides 40. However, spokes 29 are offset slightly from a center line of the lanes which extends along the direction of conveyance. This relationship is best illustrated in FIG. 1. Servo motor M is coupled to shaft 18 to drive shaft 18 at a desired rotational speed so that the speed of spokes 29 tangential to the surface of conveyor 20 is slightly less than the speed of conveyor 20. Shaft 16 is mechanically coupled to shaft 18 by gears 30–32 so that shaft 16 rotates at a ratio which equals the same spoke-to-spoke ratio as shaft 18 and rotary indexer 10. In other words, each row of spokes of rotary indexer 10 which touches the conveyor in a given time period, a row of spokes of rotary displacer 12 touches the conveyor. Spokes 29 can be resiliently urged into contact with the conveyor surface in a manner similar to spokes 27.

Figure 4:
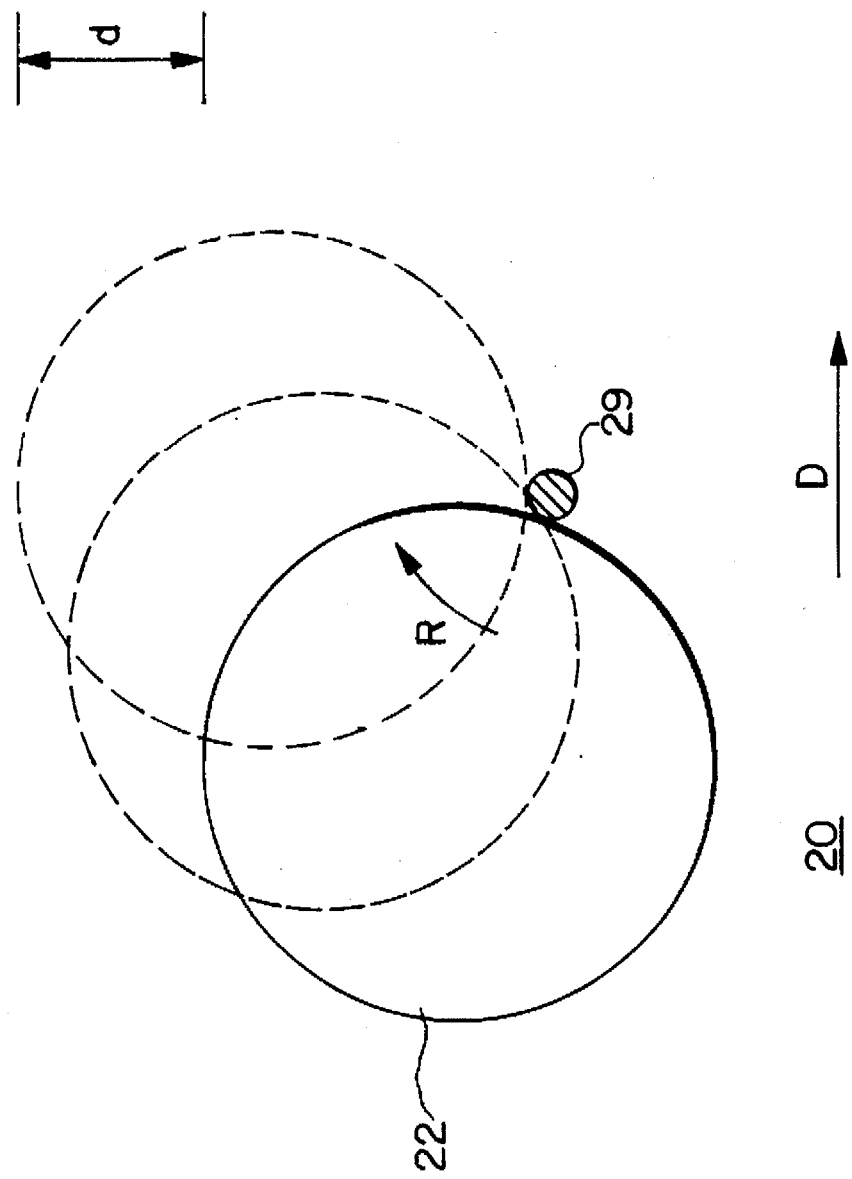
FIG. 4 is a top view of the conveyor surface, a single food item, and a single spoke of the displacer with other portions omitted to illustrate clearly the movement of the food item.

In operation, rotary displacer 12 places successive spokes 29 in the path of respective ones of successive cookies 22 which are conveyed in the lanes. Because spokes 29 are slightly displaced from the center of these lanes (the lanes being defined by guides 40) cookies 22 will be deflected to a side of the lane which is opposite the position of spoke 29 with which it interacts. Specifically, cookie 22 will rotate around spoke 29, with an edge of cookie 22 defining an axis of rotation, as illustrated by the phantom line in FIG. 4. In FIG. 4, arrow D indicates the direction of movement of conveyor 20 and arrow R indicates the direction of rotation of cookies 22 around spoke 29.

Therefore, cookie 22 will be displaced through a distance d (FIG. 4) as illustrated at line B in FIG. 3. The displaced cookies are then transported to a known slide alignment device, such as a SLIDE-ALIGN (Tradename), which consists of a plurality of chutes. The staggered cookies 22 can be easily directed into adjacent chutes to thereby change the number of lanes of cookies as indicated at line C of FIG. 3. Of course, spokes 29 can be placed on desired sides of the lanes to deflect cookies 22 to a desired side of the lane. In the preferred embodiment, alternate spokes 29 are offset from the center of the lane in opposite directions to cause every other cookie 22 to be displaced in opposite directions. However, other deflection patterns can be established by disposing spokes 29 in a desired manner. By varying the ratio of alternating spokes, the cookies can be displaced in a desired manner to provide variable changes in the number of lanes. For example, the lanes can be changed to three lanes, three to four, four to five, and so on. Any desired lane number change can be accomplished.

Figure 5:
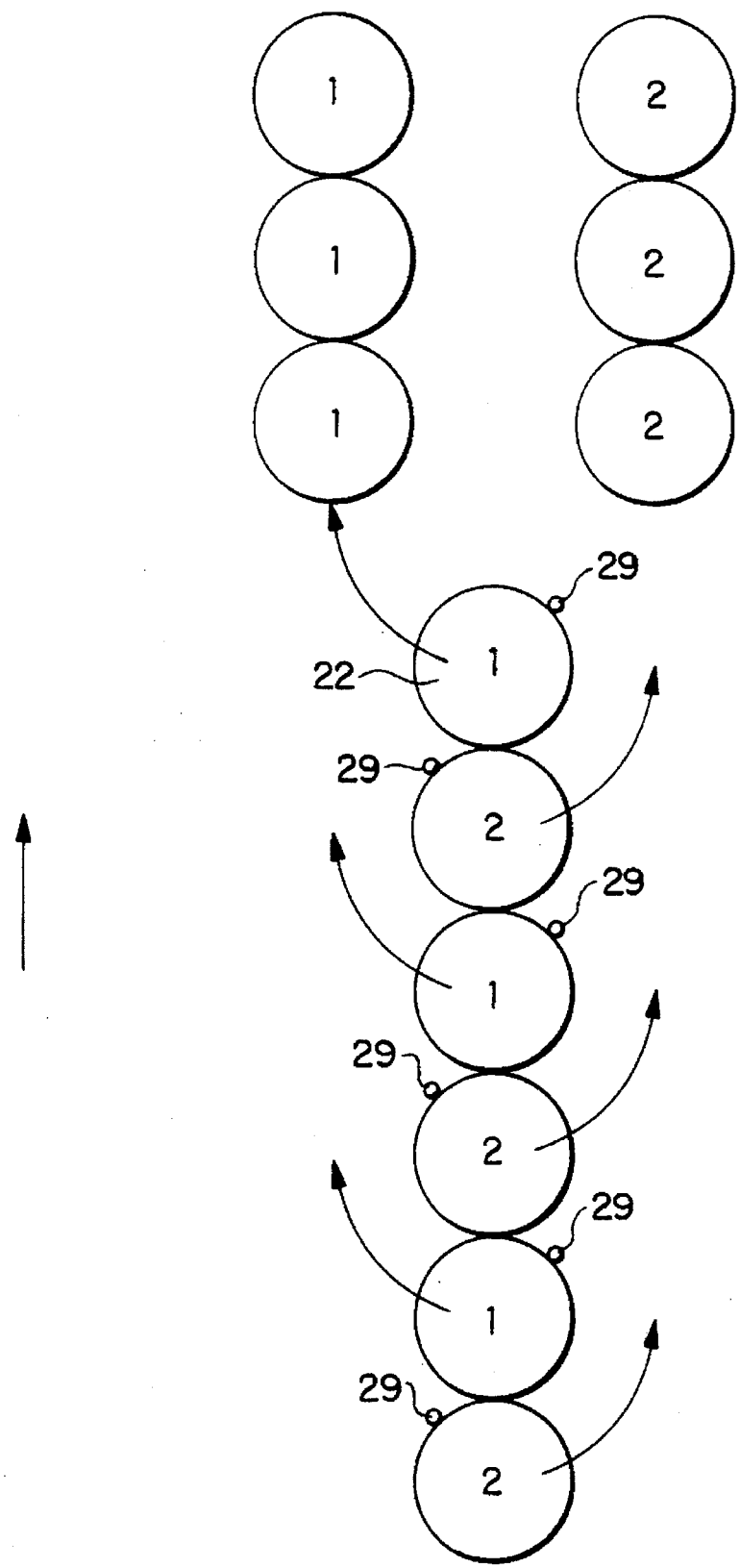
FIGS. 5-8 illustrate various arrangements of the displacer.

For example, as illustrated in FIG. 5, cookies 22 (only one of which is marked with a reference numeral) can be displaced from one row to two rows. In FIG. 5, spokes 29 and cookies are illustrated in series along the page for clarity. The cookies 22 below the dotted line represent cookies 22 that have not been displaced. The cookies 22 above the dotted line represent cookies 22 that have been displaced. Of course, spokes 29 interact with a corresponding cookie 22 at a particular position as the cookies 22 are conveyed in the direction of the arrow and the rotary displacer is rotated. In FIG. 5, alternating spokes 29 are displaced, through interaction with spoke 29 in the manner described above, to alternating sides on the incoming cookies 22 to displace alternating cookies in opposite directions and thus change the number of lanes from 1 to 2. The numbers on cookies 22 represent the number of the lane to which each cookie will be displaced. The curved arrows represent the path of cookie 22 as it pivots around spoke 29.

Figure 6:
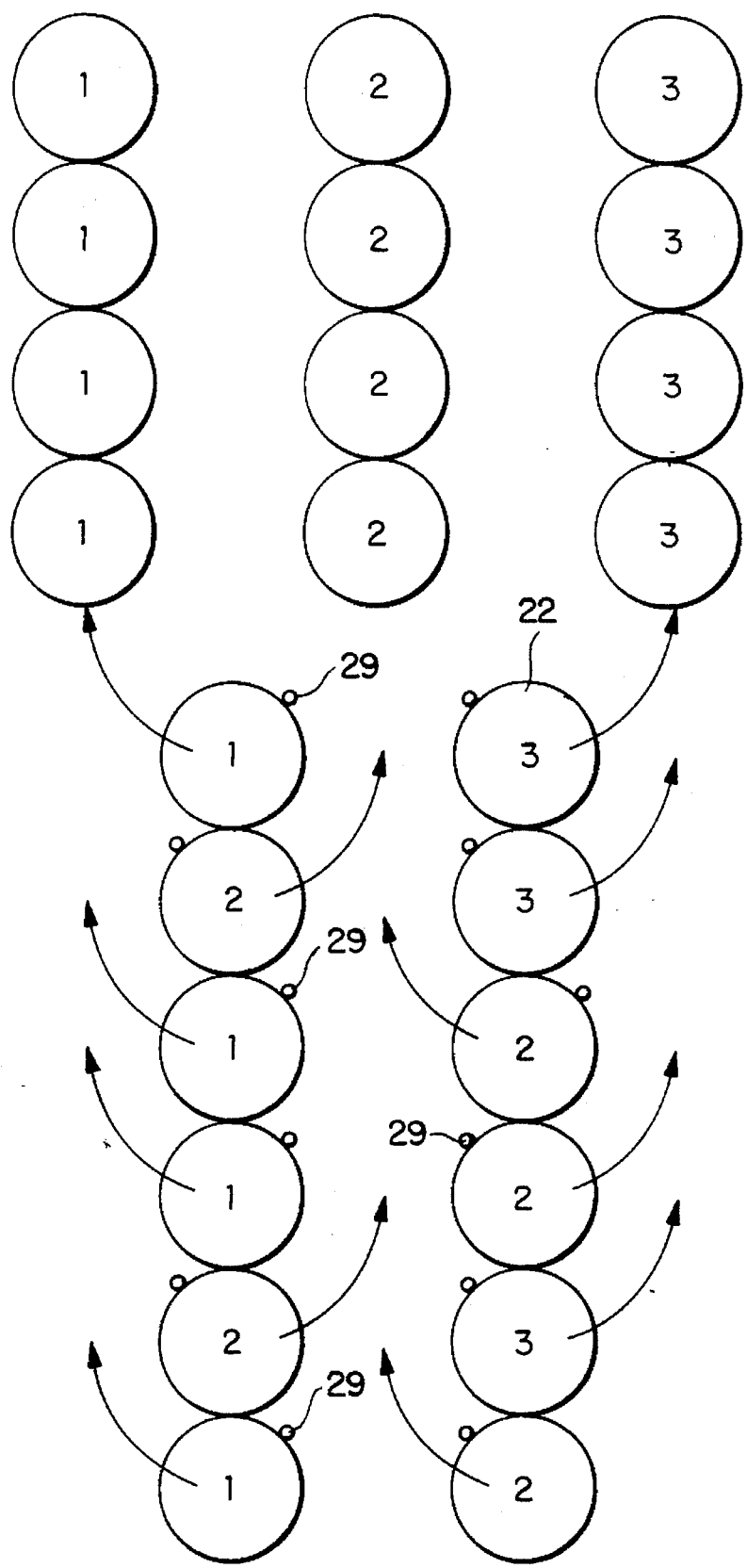

Similarly, FIG. 6 illustrates an arrangement in which two lanes are displaced into three lanes. It can be seen that the first pin to interact with the leftmost lane is displaced to the right, the second pin to the left, the third pin to the right, the fourth pin to the right, the fifth pin to the left, the sixth pin to the right, and so on. The first pin to interact with the rightmost lane is displaced to the left, the second pin to the left, the third pin to the right, the fourth pin to the left, the fifth pin to the left, the sixth pin to the right, and so on. This arrangement causes cookies 22 to be displaced from 2 lanes to three lanes by displacing the cookies in the direction of the curved arrows. Based on FIG. 6, it can bee seen that 4 of the 12 illustrated cookies entering rotary indexer 12 will be displaced to each of the three lanes.

Figure 7:
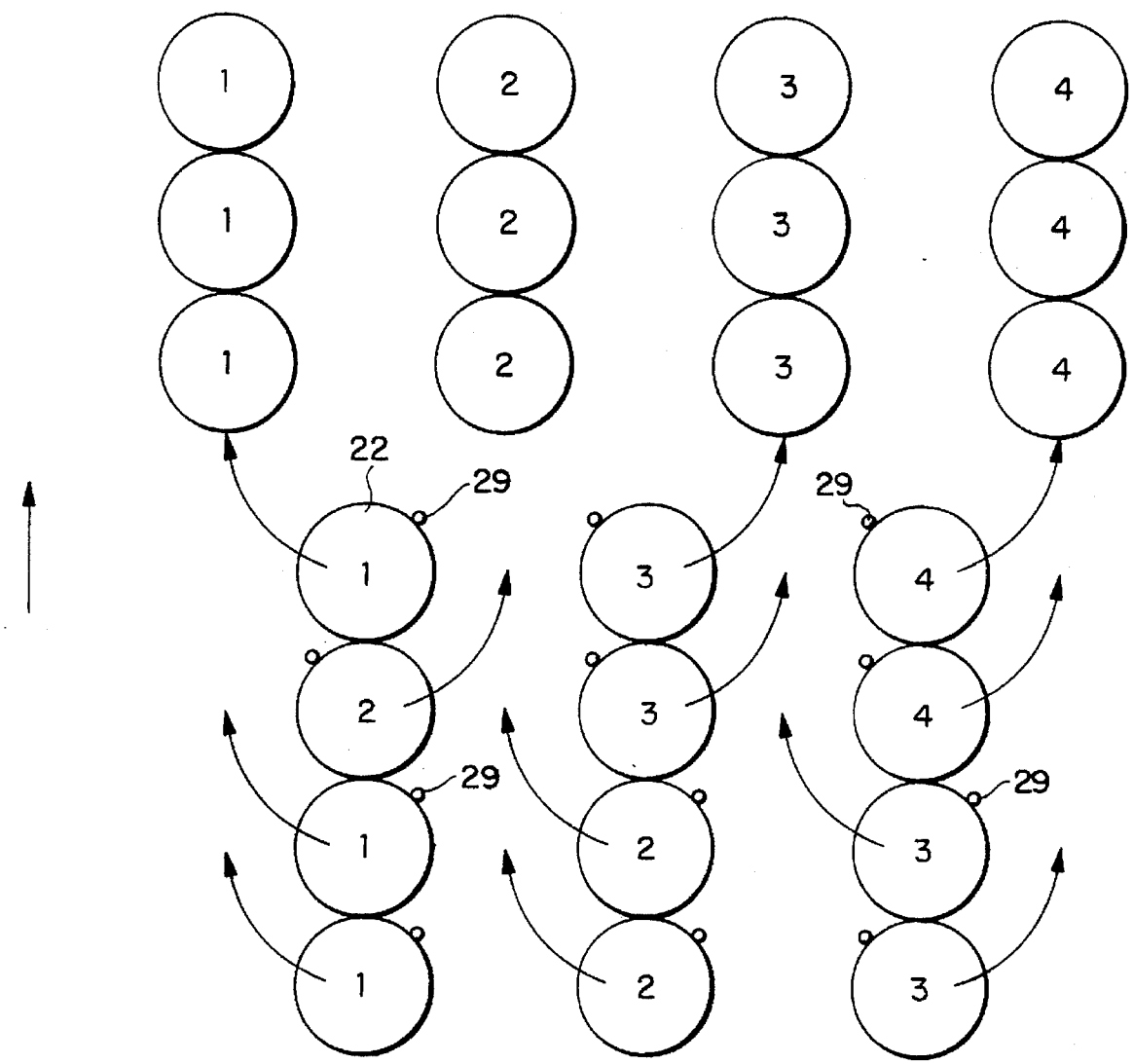
Figure 8:
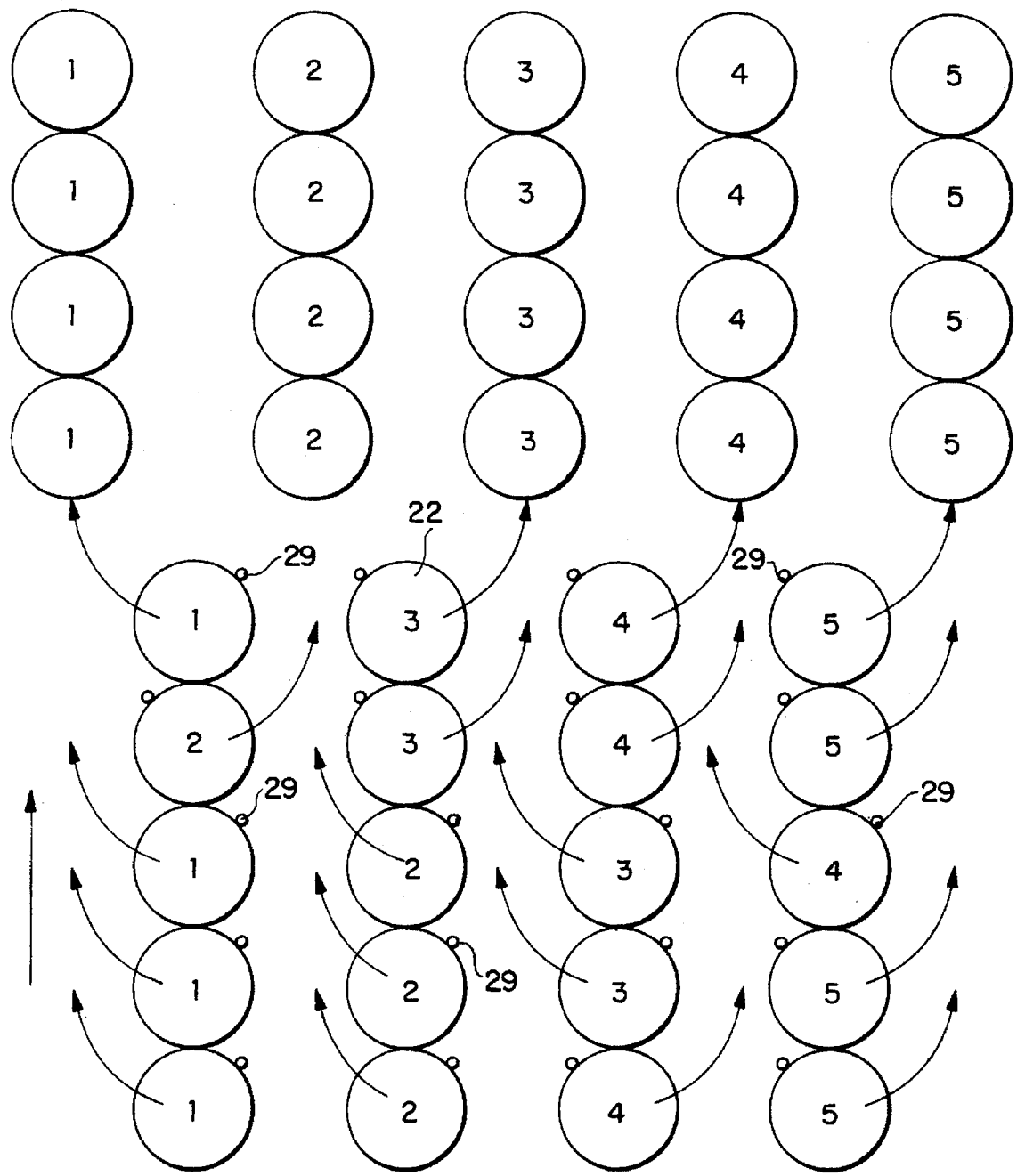

FIGS. 7 and 8 illustrate arrangements in which 3 lanes can be changed to four lanes and in which four lanes can be changes to five lanes respectively. Elements of FIGS. 7 and 8 that are similar to FIGS. 5 and 6 are labeled with like reference numerals. Based on these illustrations, which are only examples of the various arrangements, it can be seen that virtually any number of lanes can be changed to any other number of lanes using the invention. For example, the arrangements of the spokes can be varied or the illustrated devices can be combined with each other in series or in parallel to attain the desired result. Further, the invention can be used to reduce the number of lanes also.

As noted above, the respective shafts of the rotary indexer and the rotary displacer are interlocked to move in concert. In addition, the speed of the conveyor is controlled to be coordinated with the speed of these shafts through known control devices, such as servo motors and a microprocessor based controller. Of course, as the speed of the conveyor is increased, the speed of the rotating shafts is increased accordingly.

What is claimed is:

1. An apparatus for multiplying the number of lanes of conveyed food items, said apparatus comprising:

a conveyor having a conveying surface for receiving food items to be conveyed and sorted;

means for guiding said food items into at least one parallel lane on said conveying surface;

an indexing device disposed above said conveying surface for uniformly spacing said food items in the parallel lanes while said food items are being advanced by said conveyor;

a displacement rotary member disposed above said conveying surface at a position which is downstream from said indexing device, said displacement rotary member having a rotational axis that is perpendicular to a conveying direction of said conveyor and plurality of first spokes extending therefrom, said spokes respectively extending to at least said conveying surface, and first spokes having a smaller horizontal velocity, at said conveying surface, than said conveying surface, said first spokes being disposed within respective ones of the lanes as said first spokes approach said conveying surface, said first spokes being offset from a center of said lanes to cause said food items to be displace by interaction with said first spokes as said food items are conveyed past said displacement rotary member; and means for rotating said displacement rotary member.

2. An apparatus as recited in claim 1 wherein each of said first spokes is resiliently urged into contact with said planar conveying surface.

3. An apparatus as recited in claim 1 wherein said indexing device comprises an indexing rotary member having a plurality of pairs of second spokes extending therefrom and respectively extending to at least said conveying surface, each of said second spokes being resiliently urged into contact with said planar conveying surface and having a smaller horizontal velocity, at said conveying surface, than said conveying surface.

4. An apparatuses recited in claim 3, further comprising:

means for rotating said indexing rotary member in concert with said displacement rotary member.

5. An apparatus as recited in claim 4, further comprising:

means for directing said food items in one lane into separate lanes after said food items have been displaced by said first spokes.

6. An apparatus for multiplying the number of lanes of conveyed food items, said apparatus comprising:

a conveyor having a conveying surface for receiving food items to be conveyed and sorted;

means for guiding said food items in at least one parallel lane on said conveying surface;

a displacement rotary member disposed above said conveying surface at a position which is downstream from said means for guiding, said displacement rotary member having a rotational axis that is perpendicular to a conveying direction Of said conveyor and plurality of first spokes extending therefrom, said spokes respectively extending to at least said conveying surface, said first spokes having a smaller horizontal velocity, at said conveying surface, than said conveying surface, said first spokes being disposed within respective ones of the lanes as said first spokes approach said conveying surface and said first spokes being offset from a center of said lanes to cause said food items to be displaced by interaction with said first spokes as said food items are conveyed past said displacement rotary member; and means for rotating said displacement rotary member.

* * * * *